Figure 1:
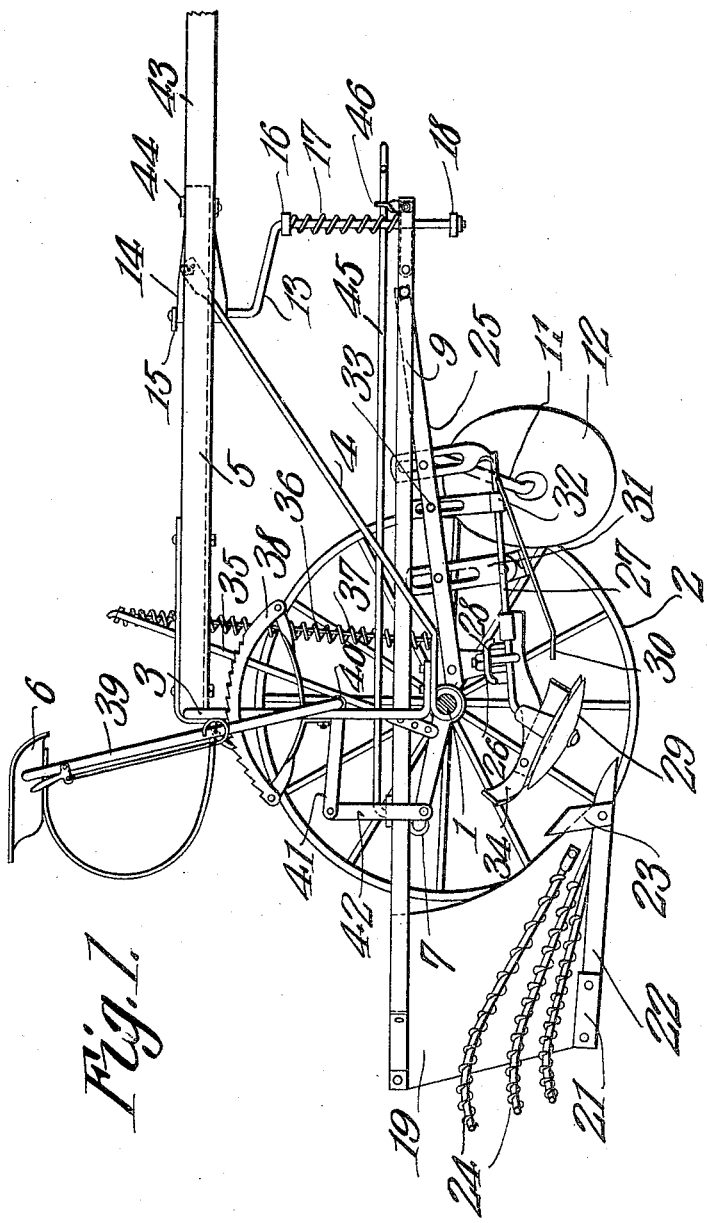

W. KITE.
BEET HARVESTER.
APPLICATION FILED FEB. 18, 1908.

909,424.

Patented Jan. 12, 1909.

2 SHEETS—SHEET 1.

Witnesses

Inventor
Willis Kite.
By C.A. Snow & Co.
Attorneys

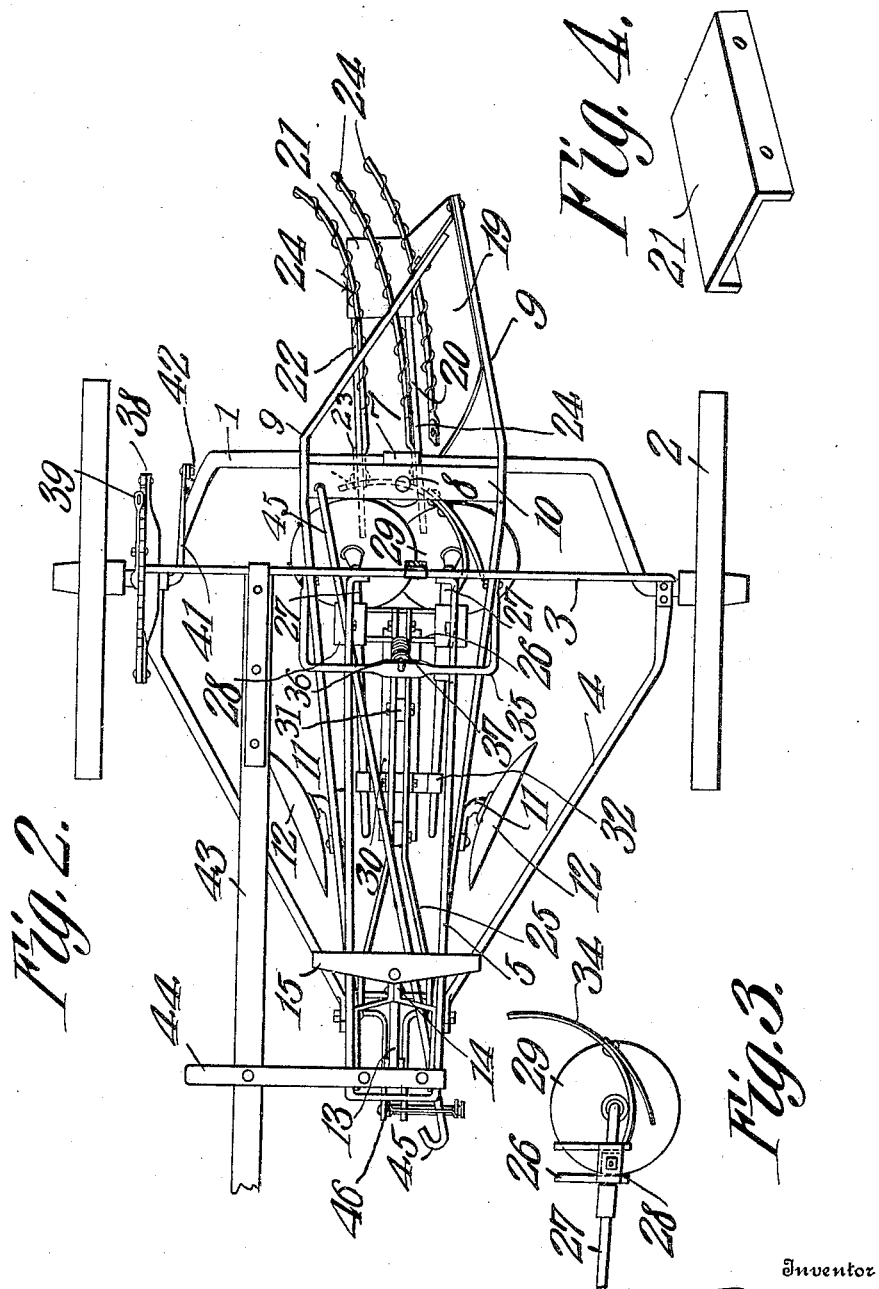

UNITED STATES PATENT OFFICE.

WILLIS KITE, OF LAS ANIMAS, COLORADO, ASSIGNOR OF ONE-HALF TO WILLIAM A. COLT AND WILLIAM A. COLT, JR., BOTH OF LAS ANIMAS, COLORADO.

BEET-HARVESTER.

No. 909,424.  Specification of Letters Patent.  Patented Jan. 12, 1909.

Application filed February 18, 1908. Serial No. 416,581.

*To all whom it may concern:*

Be it known that I, WILLIS KITE, a citizen of the United States, residing at Las Animas, in the county of Bent and State of Colorado, have invented a new and useful Beet-Harvester, of which the following is a specification.

This invention relates to agricultural implements and more especially to beet harvesters.

The invention consists in certain novel features of construction, arrangement of parts and combination of details, hereinafter fully described, illustrated in the accompanying drawings, and specifically claimed.

The object of the invention is to provide an improved form of harvester of the character indicated which consists of means for throwing the earth away from a row of beets, followed by a means for removing the crowns and tops of the beets and depositing them to one side, and the last means being followed by an improved plow adapted to dig the beets from the ground with improved means for separating them from the soil and depositing them upon the surface in the wake of the implement.

In the accompanying drawings:—Figure 1 is a side elevation of the beet harvester with parts removed. Fig. 2 is a top plan view of the harvester. Fig. 3 is a detail showing the beet top guide. Fig. 4 is a detail view of the spreader plate.

Similar numerals of reference are employed to indicate corresponding parts throughout the several figures of the drawings.

The harvester comprises a U-shaped axle 1, at the ends of which are journaled the supporting wheels 2. A frame is pivoted to said axle just within the inner side of the supporting wheels 2. Said frame comprises a bridge portion 3 and a forwardly extending portion 4. Said portion 4 inclines upwardly from its point of attachment to the axle, and horizontal bars 5 connect the bridge portion with the forward ends of the portions 4. A seat 6 is mounted between the bars 5 upon a spring carried by the bridge 3. A collar 7 is carried upon the axle 1, and a pivot 8 is held thereon. The frame carrying the various cutters and guides is mounted upon said pivot 8. Said frame consists of beams 9 which are joined together at their ends and spread apart at the intermediate portion, being united by a cross piece 10 through which extends the pivot 8 before mentioned. The standards 11 depend from the forward portion of the beams 9 and are provided with disks 12 journaled thereon. These disks are disposed at an angle to each other and at an angle to the line of draft of the implement, and are adapted to remove the soil from the sides of the row of plants. A bent lever 13 is carried in bearings 14 mounted between the beams 5 of the frame. The upper end of said lever is provided with laterally disposed foot pedals 15. The collar 16 is formed upon said lever at the lower bend thereof, and a spring 17 is held between said collar and the beams 9 and at all times tends to depress the beams 9 with relation to the beams 5 at the forward ends thereof. The lever 13 is held in a suitable guide between the beams 9, so that the ends thereof may slide upon said lever 13 and a stop 18 is provided at the lower end of the lever to prevent said beams sliding off of said lever. The beams 9 are thus enabled to be swung in a transverse direction to the draft of the implement. A mold-board 19 is attached to the rear end of the beams 9 and is provided at its lower edge with a bar 20 to which is attached a spreader plate 21 so called on account of its spreading the bars 20 and 22 apart as shown in Fig. 2 preferably of U-shape. A bar 22 is attached to said spreader plate in approximately parallel position to the bar 20, these bars constituting the plow point. The second bar is provided with a substantially vertically disposed colter 23 which is adapted to cut the tendrils from one side of the roots as they are dug from the ground. Sifting bars 24 are mounted on the digging bars and mold-board and are provided with spirally formed surfaces arranged so that beets passing thereover will have the dirt scraped from them, the beets falling outward from the mold-board, while the dirt drops toward the opposite side and nearer the mold-board. These bars are so spaced that the clods of earth will be carried up along them together with the beets contained therein. By reason of the spirally formed surfaces of the bars the clods are broken up and the fine earth dropped between the bars. The beets, however, will not pass between the bars but on account of the peculiar arrangement in which the bar nearest the mold-board is placed above the other bars, the beets themselves will be thrown off to one side. A frame carrying the crown and top removing cutters is pivoted to the beams 9. Said frame consists of the bars 25, to the rear ends of which is attached a cross piece 26. Spindles 27 depend from the ends of the cross piece 26 and are adjustable with relation to each other by means of clamps 28. Cutters 29 are held to the lower ends of said spindles, and by means of the clamps 28 may be adjusted with relation to each other, so that their inner edges may be made to overlap to any required degree. A shoe 30 is attached at its forward end between the bars 25, and is adjustable thereon. The rear end of said shoe terminates just in advance of the cutters 29 and is adapted to regulate the depth from the ground at which said cutters will operate upon the roots of the plants. An adjustment 31 is provided to vary the angular relation of the shoe 30 with the ground.

The forwardly extending portions of the spindles 27 are carried in bearings 32 adjustably attached to bars 25, as shown at 33. A guide 34 is mounted on one of said spindles, and extends backward over and behind the cutters 29, being curved in such a manner as to push the beet tops to one side as they are cut from the beets. A yoke 35 disposed in a substantially vertical direction is attached at its ends to the beams 9. A rod 36 passes through a perforation provided at the upper intermediate portion of said yoke, the lower end of said rod being attached to the bars 25. A coiled spring 37 surrounds the rod 36 and bears at its lower end upon the upper edges of the bars 25, and at its upper end upon the under side of the yoke 35. Said spring is under tension and tends to retain the bars 25 in their lowermost position. A gear segment 38 is mounted upon the frame of the implement, and a latch lever 39 is, also, pivoted upon this frame, as at 40. The lever 39 is provided with an arm 41 from which depends a link 42 attached at the lower end thereof to the rearwardly extending portion of the axle 1. It will be plain that by moving the lever 39, the axle 1 and with it the parts depending therefrom may be raised or lowered with reference to the center of the wheels and the depth at which the cutters and digging plow operate may thus be adjusted to suit varying conditions.

A tongue 43 is attached at the rear end to the bridge 3 of the frame, and at its forward end is connected with the beams 5 by means of links 44. A draft rod 45 is fixed at the rear end to the cross piece 10 and at its forward portion passes through an eye 46 located upon a laterally extending lug attached to the forward ends of the beams 9. This arrangement permits the draft animal to pass along the side of the row of plants, while the diggers and cutters engage the plant.

What is claimed is:—

1. A beet-harvester comprising a U-shaped axle mounted upon wheels, a frame superimposed upon the axle, means attached to the frame and connected with the axle for swinging the intermediate portion thereof, beams supported at their forward ends upon the frame and at their rear portions by the intermediate portions of said axle, earth-cutters, beet-cutters, a top guide, and a plow carried by the said beams.

2. A beet-harvester comprising a U-shaped axle mounted upon wheels, a frame superimposed upon the axle, beams pivotally connected at their forward ends with said frame and supported at their rear portions upon the axle, a foot-lever fulcrumed in the frame and engaging the forward portions of said beams, and earth-cutters, beet-cutters, a top guide, and a plow carried by the beams.

3. A beet harvester comprising a U-shaped axle mounted upon wheels, a frame superimposed upon the axle, means mounted upon the frame and connected with the axle for swinging the intermediate portion thereof, beams pivotally connected at their forward ends with the frame and supported at their rear portions upon the intermediate portion of the said axle, a foot-lever fulcrumed to the frame and engaging said beams and earth-cutters, beet-cutters, a top guide, and a plow carried by said beams.

4. A beet harvester comprising a U-shaped axle mounted upon wheels, a frame superimposed above the axle, means mounted upon the frame and connected with the axle for swinging the intermediate portion thereof, beams connecting at their forward ends with the frame and supported at their rear portions upon the axle, a foot-lever journaled upon the frame and engaging said beams, cutters carried by the beams, a plow also carried by the beams, bars pivoted between the beams and horizontally-disposed overlapping cutters carried by said bars, and a guide held upon and behind said cutters.

5. A beet harvester comprising a U-shaped axle mounted upon wheels, a frame superimposed above the axle, means carried by the frame and connected with the axle for swinging the intermediate portion thereof, beams connected at their forward ends with said frame by a doubly bent lever, one arm of which is provided with a spring adapted to constantly press said ends down and supported at their rear portions by said axle, earth-cutters, beet-cutters and a plow carried by the beam, a foot lever held upon the said doubly bent lever to operate the same, a tongue attached at its rear end to the frame and connected at an intermediate point with the forward end of the frame, a draft-rod attached at its rear end to a cross-piece carried by the beams and passing at its forward portion through an eye located at the forward ends of the beams.

In testimony that I claim the foregoing as my own, I have hereto affixed my signature in the presence of two witnesses.

WILLIS KITE.

Witnesses:
NOAH KITE,
W. F. ELKIN.